US005737701A

United States Patent [19]

Rosenthal et al.

[11] Patent Number: 5,737,701

[45] Date of Patent: Apr. 7, 1998

[54] AUTOMATIC AUTHENTICATION SYSTEM

[75] Inventors: Eugene J. Rosenthal, Edison; David Phillip Silverman, Somerville; Michael Zaleski, North Plainfield, all of N.J.

[73] Assignee: AT&T Corp., Middletown, N.J.

[21] Appl. No.: 538,679

[22] Filed: Oct. 3, 1995

[51] Int. Cl.[6] .......... H04M 11/00; H04M 3/00

[52] U.S. Cl. .......... 455/411; 455/406; 455/564; 379/199; 379/188; 379/196

[58] Field of Search .......... 379/58, 59, 91, 379/111, 112, 113, 114, 144, 120, 200, 199, 188, 189, 196, 197; 340/825.31, 825.3, 825.33, 825.34; 380/23; 455/33.1, 410, 411, 415, 564, 565, 405, 406, 409

[56] References Cited

U.S. PATENT DOCUMENTS

| | | | |
|---|---|---|---|
| 4,860,341 | 8/1989 | D'Avello | 455/409 |
| 4,893,330 | 1/1990 | Franco | 379/91 |
| 5,357,564 | 10/1994 | Gupta | 379/196 |
| 5,388,148 | 2/1995 | Seiderman | 455/409 |
| 5,450,479 | 9/1995 | Alesio | 379/91 |
| 5,479,494 | 12/1995 | Clitherow | 379/196 |
| 5,495,521 | 2/1996 | Rangachar | 379/189 |
| 5,557,654 | 9/1996 | Maenpaa | 379/58 |
| 5,566,234 | 10/1996 | Reed | 379/188 |

*Primary Examiner*—Dwayne Bost
*Assistant Examiner*—Brian L. Johnson

[57] ABSTRACT

A communications system is designed to exempt communications services users, such as wireless communications subscribers and calling card callers, from entering an authentication code for calls directed to pre-selected destination numbers, notwithstanding the authentication code entry requirement implemented by the communications services provider for all other calls.

24 Claims, 6 Drawing Sheets

FIG. 3

| MOBILE IDENTIFICATION NUMBER | ELECTRONIC SERIAL NUMBER | DESTINATION NUMBER | SPEED DIAL POSITION | DATE AND TIME | CHARACTERISTIC | COUNTER |
|---|---|---|---|---|---|---|
| 908-333-1234 | XXXXX | 908-524-3268 | 1 | YYDDDHHMMSS | P | 2 |
| | | 212-713-1695 | 2 | YYDDDHHMMSS | P | 3 |
| | | 313-919-1952 | 3 | YYDDDHHMMSS | T | 7 |
| | | ⋮ | ⋮ | ⋮ | ⋮ | ⋮ |
| | | 908-932-1894 | N | YYDDDHHMMSS | T | 9 |
| 201-400-1804 | YYYYY | 309-728-4678 | 1 | YYDDDHHMMSS | P | 8 |
| | | 718-965-6285 | 2 | YYDDDHHMMSS | P | 6 |
| | | 201-567-5960 | 3 | YYDDDHHMMSS | T | 4 |
| | | ⋮ | ⋮ | ⋮ | ⋮ | ⋮ |
| | | 516-956-4115 | N | YYDDDHHMMSS | T | 2 |
| 212-610-6789 | ZZZZZ | 212-394-8369 | 1 | YYDDDHHMMSS | P | 5 |
| | | 718-965-6285 | 2 | YYDDDHHMMSS | P | 7 |
| | | 201-567-5960 | 3 | YYDDDHHMMSS | T | 9 |
| | | ⋮ | ⋮ | ⋮ | ⋮ | ⋮ |
| | | 516-956-4115 | N | YYDDDHHMMSS | T | 11 |
| 202-777-9876 | WWWWW | 202-456-6789 | 1 | YYDDDHHMMSS | P | 13 |
| | | 202-325-8236 | 2 | YYDDDHHMMSS | P | 8 |
| | | 309-728-4678 | 3 | YYDDDHHMMSS | T | 6 |
| | | ⋮ | ⋮ | ⋮ | ⋮ | ⋮ |
| | | 608-354-9062 | N | YYDDDHHMMSS | T | 2 |

FIG. 5

| CARD NUMBER | DESTINATION NUMBER | DATE AND TIME | CHARACTERISTIC | COUNTER |
|---|---|---|---|---|
| 201-949-1210 | 201-308-1213 | YYDDDHHMMSS | P | 2 |
| | 201-907-1234 | YYDDDHHMMSS | P | 3 |
| | 908-354-5678 | YYDDDHHMMSS | T | 7 |
| | ⋮ | ⋮ | ⋮ | ⋮ |
| | 202-563-1339 | YYDDDHHMMSS | T | 9 |
| MY CARD | 718-469-0123 | YYDDDHHMMSS | P | 8 |
| | 215-753-1833 | YYDDDHHMMSS | P | 6 |
| | 601-987-6543 | YYDDDHHMMSS | T | 4 |
| | ⋮ | ⋮ | ⋮ | ⋮ |
| | 201-923-5432 | YYDDDHHMMSS | T | 2 |
| 501-012-8329 | 215-678-9012 | YYDDDHHMMSS | P | 5 |
| | 615-238-7854 | YYDDDHHMMSS | P | 7 |
| | 708-456-0615 | YYDDDHHMMSS | T | 9 |
| | ⋮ | ⋮ | ⋮ | ⋮ |
| | 212-899-7258 | YYDDDHHMMSS | T | 11 |
| 3797-08654-09321 | 704-859-7007 | YYDDDHHMMSS | P | 13 |
| | 716-426-8219 | YYDDDHHMMSS | P | 8 |
| | 908-526-1445 | YYDDDHHMMSS | T | 6 |
| | ⋮ | ⋮ | ⋮ | ⋮ |
| | 908-723-5865 | YYDDDHHMMSS | T | 2 |

AUTOMATIC AUTHENTICATION SYSTEM

TECHNICAL FIELD OF THE INVENTION

This invention relates to communications systems, and more specifically, to a method and system for automatically authenticating users of communications services.

BACKGROUND OF THE INVENTION

The growing epidemic of calling-card and wireless communications fraud has deprived, and continues to deprive, wireless communications carriers of hundreds of million of dollars per year. Typical fraudulent ploys for the theft of wireless communications services include, for example, programming the Mobile Identification Number (MIN) and the Electronic Serial Number (ESN) of a legitimate subscriber's wireless telephone set into an illegal wireless device to enable a fraud perpetrator to charge calls to the legitimate subscriber's account. As to calling card numbers, different fraudulent ploys are used for illegally acquiring a subscriber's calling card number for subsequent theft of communications services. Those fraudulent ploys include a) eavesdropping on a subscriber's conversation when the subscriber is reading his or her calling card number to an operator, and b) standing behind a subscriber to peek at the subscriber's calling card number when the subscriber is using his or her calling card at a public telephone set.

In response to this ever-growing problem, some communications carriers have felt compelled to implement additional fraud prevention measures that either deny or restrict access to their network for certain types of wireless or calling-card calls. For example, some communications carriers have implemented drastic fraud prevention procedures, such as denial of service for calls that are either directed to certain foreign countries or originated from particular remote roaming areas. Other less restrictive procedures implemented by communications carriers include alerting a subscriber of any unusual calling patterns associated with a subscriber's account (MIN or calling card number). By far the most widely used fraud prevention measure is the procedure that requires a legitimate subscriber to authenticate himself or herself by entering a code, e.g., a Personal Identification Number (PIN), before the subscriber can complete one or more calls on a communications network.

While the authentication code entry requirement has been quite effective in limiting incidences of communications fraud, it is undeniable that it has certain shortcomings. For example, the inconvenience of dialing the additional four to six digits of the authentication code increases the likelihood of occurrence of unpleasant situations. Those situations include a) the necessity of re-dialing a destination number and an authentication code after a previous authentication code has been misdialed and b) increased risk of automobile accidents due to inattention to road traffic by wireless callers/drivers who are busy keying the additional digits for the authentication code.

In an effort to overcome some of the inconveniences of the authentication code entry, some subscribers who have wireless telephone sets that support speed-dialing, have programmed their telephone sets to store the four- or six-digit authentication code in a non-volatile memory associated with one of the speed-dial keys. Unfortunately, this solution is unavailable for wireless telephone sets without speed-dial capability. Equally disturbing is the fact that this solution increases the likelihood of fraud when the wireless telephone set is physically stolen or lost. Hence, it is a continuing problem for wireless communications carriers to implement non-intrusive fraud prevention measures that are not unduly inconvenient for subscribers Equally inconvenienced by the authentication code entry requirement are calling card subscribers who typically enter a PIN after keying in a calling card number. Communications carriers claim that the PIN is needed because a calling card number can be a credit card number or a telephone line number, such as a subscriber residential telephone number. Because the residential telephone numbers of calling card subscribers are readily available, the authentication code is used as a fraud prevention measure to deny access to communications services when the PIN is not entered. As used herein, the term "card" refers to any type of credit card or credit account mechanism including, but not limited to: a) a telephone-company-issued calling card, b) a combined commercial credit card and telephone calling card, c) a commercial credit card or d) a debit card. A "card number" is a multi-digit string that identifies the account associated with a card. A "card call" is a telephone call whose cost is charged to a card. It will be appreciated that card issuers, i.e., the providers of the credit for each card, need not provide a tangible manifestation, such as embossed plastic, for each card.

In an attempt to provide calling card subscribers with convenient access to communications services, Michael Clitherow, in U.S. patent application Ser. No. 07/956,709, discloses a system that allows a calling card user to provide a vanity calling card number, as opposed to a conventional calling card number, in order to complete a calling card call. Unfortunately, the convenient access to communications services afforded by the vanity calling card number is achieved at the expense of an increased likelihood of communications fraud. From a general perspective, enhancing a user's convenience without security is as disturbing to communications carriers as inconvenient fraud prevention measures are annoying to communications services users.

It has been suggested that because digital wireless telephones sets are equipped with powerful microprocessors capable of encrypting and decrypting information, (e.g., MIN and ESN) the authentication code entry, as it exists today, will be obsolete when digital wireless telephone sets are used to complete calls over digital wireless networks. However, distribution of encryption keys provides a window of opportunity for fraud. In addition, "breaking" the cipher of an encryption system is not beyond the capability of highly motivated fraud perpetrators. Moreover, exchange of terminal identification information (e.g., MIN and ESN) in encrypted format does not decrease the likelihood of fraud when the terminal is physically stolen. Hence, it is a continuing problem for communications carriers to implement non-intrusive fraud prevention measures that are not unduly inconvenient for subscribers. From a more general perspective, a solution is needed to relieve communications services users of the burden of entering an authentication code to receive those services without exposing the services providers to undue fraud risks.

SUMMARY OF THE INVENTION

We have realized that a fraud perpetrator who is illegally in possession of either a calling card number or a wireless device that is programmed with the MIN and/or ESN of a legitimate subscriber would generally attempt to complete calls to different destination numbers than the ones typically dialed by the legitimate subscriber. Hence, the prior-art burdensome authorization code requirement can be waived for destination numbers pre-authorized by a legitimate subscriber without exposing a communications network to undue fraud risks.

The present invention is directed to a system that exempts communications services users, such as wireless communications subscribers and calling card users, from entering an authentication code for calls directed to selected destination numbers, notwithstanding the authentication code entry requirement implemented by the communications services provider for all other calls. The selected destination numbers are stored in an override profile that associates those destination numbers with identification information associated with the call, such as the MIN/ESN of a subscriber's wireless telephone set, or the calling card number provided by a calling card subscriber.

In accordance with the principles of the invention, when a wireless communications subscriber initiates a call without entering an authentication code, information associated with the call, such as the MIN/ESN of the subscriber's wireless telephone set or the calling card number, is used as a search key to retrieve the override profile associated with that MIN/ESN or calling card number. Using well-known database search techniques, the called number entered by the subscriber is compared to the selected destination numbers stored in the subscriber's profile. If a match is found, the authentication code entry requirement is waived for that call, and the call is processed in a conventional manner. If the called party number does not match any selected destination numbers in the profile, optionally, the caller is prompted to enter an authentication code. If the authentication code is invalid, optionally, a message indicative of service denial is delivered to the caller before the call is terminated.

According to one aspect of the invention, a Voice Information System (VIS) receives information from subscribers who access it to provide selected destination numbers for entry into its override profile.

According to another aspect of the invention, a destination number is automatically entered into the override profile when a subscriber dials the destination number and an authentication code when completing a call. Because the override profiles have a limited number of entries, the profiles are automatically updated based upon a given policy. Such a policy may be, for example, 1) a Least-Used-First-Out (LUFO) policy, i.e., the least-used entry in the profile is the first one to be purged therefrom when a new entry has to be added to the profile or 2) a First-In-First-Out (FIFO) basis i.e., the oldest variable entry is the profile is the first one to be purged therefrom when a new entry has to be added to the profile. Alternatively, a user's profile may have fixed entries that are stored on a quasi-permanent basis and variable entries that are updated based upon a LUFO or FIFO basis.

Ironically, by waiving the authentication code entry requirement for selected destination numbers, the likelihood of communications fraud is advantageously decreased, because the authentication code is less exposed to potential eavesdropping.

BRIEF DESCRIPTION OF THE DRAWING

In the drawings:

FIG. 3 illustrates an override profile for that associates MINs and ESNs with selected destination numbers for outgoing wireless calls;

FIG. 5 illustrates a destination table that associates calling card numbers with sets of destination numbers for which an authentication code is not required.

DETAILED DESCRIPTION

Figure 1:
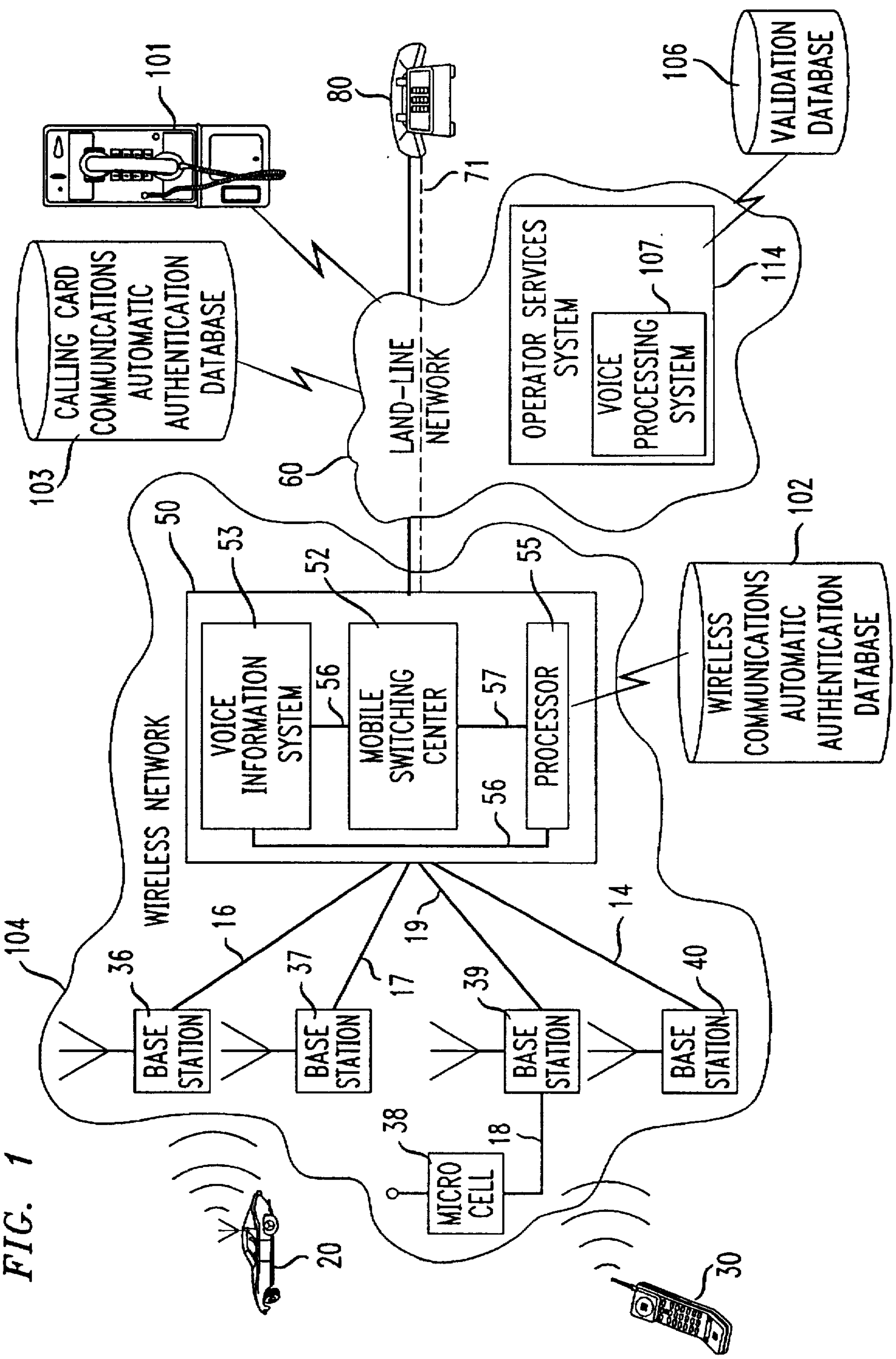
FIG. 1 is a communications switching system arranged in accordance with the invention to allow users to complete outgoing calls without having to dial a required authentication code.

Shown in the block diagram of FIG. 1 is a communications system that includes a land-line network 60 and a wireless network 104. The land-line network 60 includes interconnected local, tandem and toll switches (not shown) that enable a telephone call, such as a calling card call originated from wired telephone 101 to be completed to another telephone set, such as set 80, or to be forwarded to wireless network 104. Calling card calls routed over land-line network are completed only if the calling card number provided by the caller is validated through a database look-up operation performed at either conventional validation database 104 or automatic authentication database 103 depending on whether the caller provides an authentication code with the calling card number, as described below.

Also shown on FIG. 1 are two wireless telephone sets, namely mobile telephone set 30 and car phone 10 that can each communicate with a) other wireless telephone sets, e.g., via wireless network 104, or b) with wired telephone sets, e.g., telephone set 80 or 101, via wireless network 104 and land-line network 60. Wireless telephone sets may use any conventional wireless technology for communicating with wireless network 104. For example, wireless telephone 20 may be a conventional cellular telephone while mobile telephone set 30 may be a low-mobility portable communications device that accesses wireless network 104 via, for example, Radio Frequency (RF) signals received, by a base station such as the one associated with microcell 38. Wireless telephone sets 20 and 30 tune to the channels of wireless network 104 to receive and transmit radio signals over the free-space environment via the nearest base station (36, 37, 39 or 40) of network 104.

Wireless network 104 may be an analog communications system using, for example, the Advanced Mobile Phone Service (AMPS) analog cellular radio standard. A detailed description of an AMPS-based communications system is provided in *Bell System Technical Journal*, Vol. 58, No. 1, January 1979, pp. 1–14. Alternatively, wireless network 104 may be a digital communications system implementing well-known code division multiple access (CDMA) or time-division multiple access (TDMA) techniques. Further information on TDMA and CDMA access techniques can be found in *AT&T Technical Journal*, Vol. 72, No. 4, July/August 1993, pp. 19–26.

Before wireless telephone set 20 and 30 can receive communications services from wireless network 104, those sets must be in an active idle state. Specifically, the identity and the relative position of wireless telephone sets 20 and 30 have to be known to wireless network 104. This information is obtained as part of the conventional registration process. This registration process allows a wireless telephone set 1) to be located for incoming calls and 2) to be associated with an account number to which air time charges, whether accumulated for incoming or outgoing calls, may be billed. The registration process is typically initiated when a user powers on a wireless telephone set. Conventionally, the wireless telephone set determines the frequency of the strongest received radio signal to locate the reverse control radio channel associated with the nearest base station, which, for wireless telephone set 20, may be either base station 36 or 37 or, in the case of wireless telephone set 30, may be base station 39 or 40 or microcell 38. The reverse radio control channel is a signaling channel that is used by a base station to exchange signaling information with wireless end-user devices in the radio coverage area of a base station known as a "cell".

Once the reverse control radio channel of base station 36, for example, is located by wireless telephone set 20, that set transmits its MIN and ESN to base station 36 via the identified radio control channel. Base stations 36, 37, 38, 39 and 40 include transceivers and other hardware arranged to perform initial channel assignment for the establishment of a wireless connection. Upon receiving the MIN and ESN pair, base station 36 transmits the MIN/ESN information to wireless switch 50.

Wireless switch 50 is comprised of a set of modular hardware and software components designed to administer the allocation of radio channels within the wireless network 104, and to coordinate paging, for signaling ringing, of wireless telephone sets 10 and 30 for calls destined for those sets. Wireless switch 50 also coordinates hand-off of calls (in progress) from one base station to another, as wireless telephone sets 20 and 30 respectively leave the one cell and cross into another cell. Although wireless switch 50 is shown in FIG. 1 as being remote from base stations 36, 37, 39 and 40, it is to be understood that wireless switch 50 may be located within one of the base stations 36, 37, 39 and 40.

One of the modular components of wireless switch 50 is Voice Information System (VIS) 53, which is arranged to a) deliver recorded announcements to callers connected thereto, and b) collect information from callers, e.g., in the form of Dual Tone MultiFrequency (DTMF) signals or speech input. Collected information may be forwarded to other components of wireless switch 50, such as processor 55 for storage in databases 102 or 103, as explained below.

At the heart of wireless switch 50 is Mobile Switching Center (MSC) 52, which is a processor-controlled software-driven switching system arranged to provide seamless communications paths by bridging radio channels and wired channels for calls routed over wireless network 104 and land-line network 60. Of particular significance is the role played by MSC 52 in the authentication process mentioned above. Specifically, when wireless telephone set 10 transmits its MIN and ESN to cell site 36, the latter forwards that information to MSC 52 which uses processor 55 to query a database to validate the MIN/ESN pair and to mark in another database called "Home Location Register" (HLR), the location area (and possibly the current cell location) of wireless telephone set 20. When wireless network 104 uses CDMA as an access method, the MIN/ESN information is forwarded to the network in encrypted format using, for example, a public enciphering key and a private deciphering key. Regardless of the access method used, once the MIN/ESN pair is validated for wireless telephone set 20, MSC 52 returns an acknowledgment signal to wireless telephone set 20, which triggers the set to enter the active/idle state, and to release the control channel.

Figure 2:
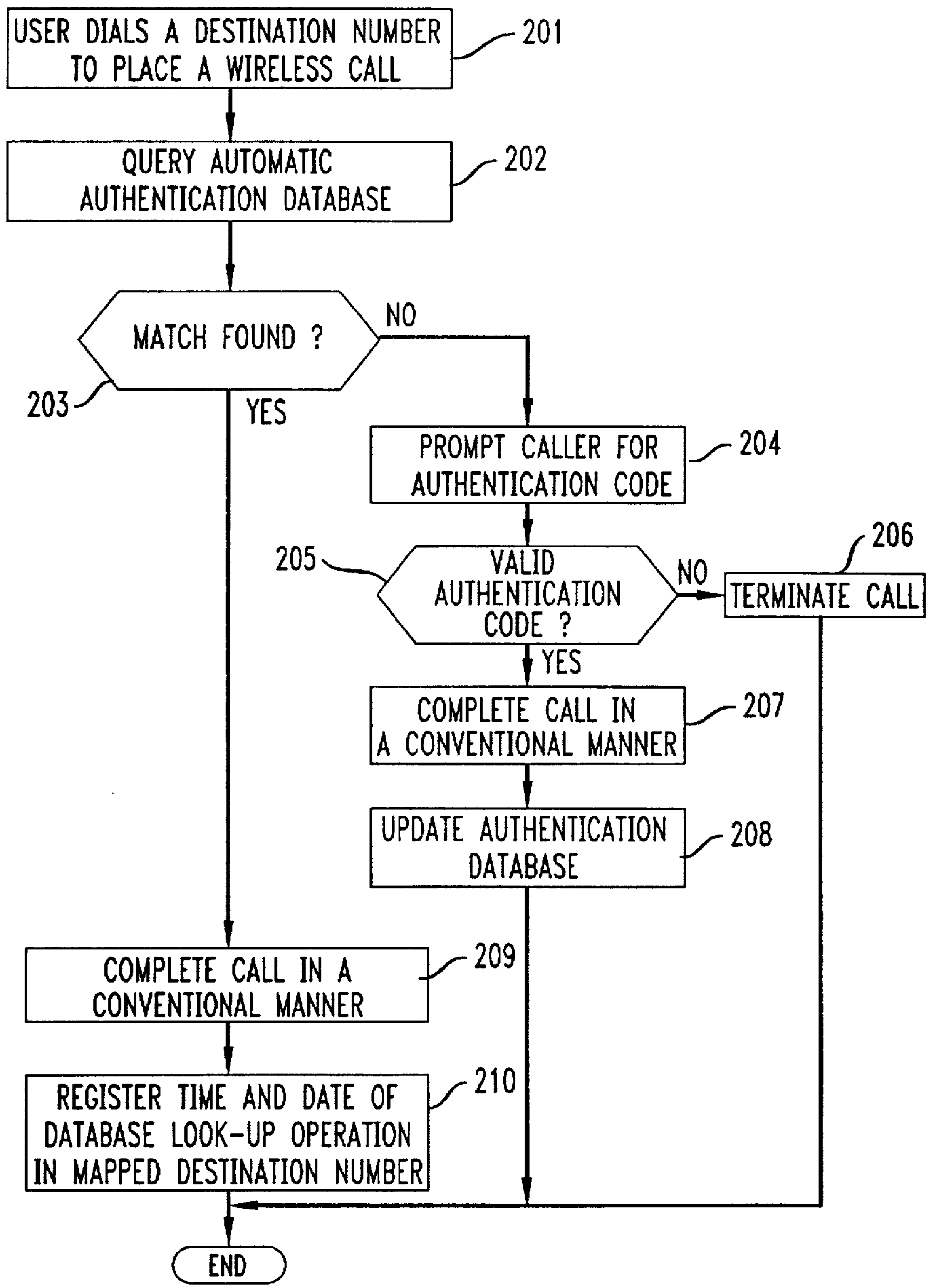
FIG. 2 is a flow diagram of call processing instructions executed by some of the components of FIG. 1 to automatically authenticate a wireless communications subscriber.

The operation of wireless network 104 and the interactions of the elements of wireless network 104 in accordance with the principles of the invention are easily understood when described in conjunction with a call flow for a connection between, for example, wireless telephone set 10 and wired telephone 80. Such a call flow is shown in FIG. 2.

The automatic authentication process of the invention is initiated in step 201 when a wireless subscriber at wireless telephone set 20, which is in the active/idle state, dials a destination number to place a wireless call directed to wired telephone set 80. Upon receiving the destination number and the MIN/ESN pair, MSC 52 forwards that information to processor 55. Using the MIN/ESN pair as a search key, in step 202, processor 55 launches a query to automatic authentication database 102 in an attempt to match the received destination number to an entry in that database. Automatic authentication database 102 is a processor-controlled database facility equipped with a mass storage device that contain instructions for a database management system (DBMS) software as well as the table of FIG. 3.

FIG. 3 illustrates a table that associates particular MIN/ESN pairs with one or more destination numbers for which the authentication code requirement is waived when a call is directed to one of the destination numbers from the telephone set having the associated MIN and ESN, in accordance with the principles of the invention. The Mobile Identification Number is a calling party number assigned to a user by a carrier for use in conjunction with a particular ESN that is associated with a specific wireless telephone set.

The destination number column of FIG. 3 shows groups of destination numbers associated with a particular MIN/ESN pair. Entries in the destination number column identify called party numbers for which the authentication code entry requirement is waived for wireless calls associated with the corresponding MIN/ESN pair. It is worth noting that those destination numbers may include national as well as international called party numbers. Furthermore, the called party numbers in the destination number column may be associated with wired as well as wireless telephone sets.

In one embodiment of the invention, every time a particular destination number in the destination number column matches a called party number dialed by a user from a telephone set having the associated MIN and ESN, the date and time of that occurrence is registered in the date and time column of FIG. 3, while the counter (shown in the rightmost column of FIG. 3) associated with the particular destination number is incremented by one. The date may be entered in YYDDD format, where YY represent the last two digits of the year, and $1 \leq DDD < 366$. The time may be registered in military time format i.e., HH:MM:SS, where $0 \leq HH < 24$, $0 < MM < 60$ and $0 \leq SS < 60$. These time and date formats allow easy comparison of the recorded dates and times associated with each different MIN/ESN pair.

Corresponding to each destination number may be a speed dial position in a subscriber's wireless telephone set. The speed dial position shown under the "speed dial position" column of FIG. 3 identifies the speed-dial key that is pressed by a caller to dial the corresponding destination number. It should be noted that a wireless subscriber can provide the information stored in his or her profile by establishing a connection, preferably a wired connection, to VIS 53, which prompts the subscriber to enter the information for storage in the form of speech input or DTMF signals.

Referring back to FIG. 2, if the destination number provided by the caller does not match any called party number in the automatic authentication database of FIG. 3 for the MIN and ESN of the calling telephone set, as determined in step 203, processor 55, in step 204, sends a message to Voice Information System (VIS) 53, via line 56, to deliver a message to the caller to prompt him or her for an authentication code. If processor 55 receives from VIS 53 an invalid authorization code provided by the user, as determined in step 205, the call is terminated, as shown in step 206. However, when it is determined in step 205 that processor 55 received a valid authentication code from the caller, the call is completed in step 207 in a conventional manner. Thereafter, processor 55, in step 208, may update automatic authentication database 102 as described below.

When processor 55 finds a match in automatic authentication database 102 for the MIN/ESN combination of the calling telephone and the destination number dialed by the caller, as determined in step 203, the authentication code entry requirement is waived and the call is then completed in step 209 in the conventional manner without further ado. Thereafter, in step 210, processor 55 may register the time and date, e.g., as derived from its internal clock, of the accessing of the entry associated with the MIN and ESN combination of the calling telephone and the destination number dialed by the caller. Additionally, processor 55 may also increment the counter for that entry.

For areas where occurrences of wireless fraud are high, processor 55 may be arranged to compare the speed dial position keyed by the caller as part of the dialing procedure to the entries in the speed dial position column of FIG. 2. In that case, for step 209 to be performed, the match that must be found in step 203 includes a) the MIN/ESN combination of the calling telephone, b) the called party number dialed by the caller, and c) the speed dial position. If no match is found for the speed dial position, the caller is prompted for an authentication code in step 204, and steps 205 through 208 are performed as needed.

Figure 4:
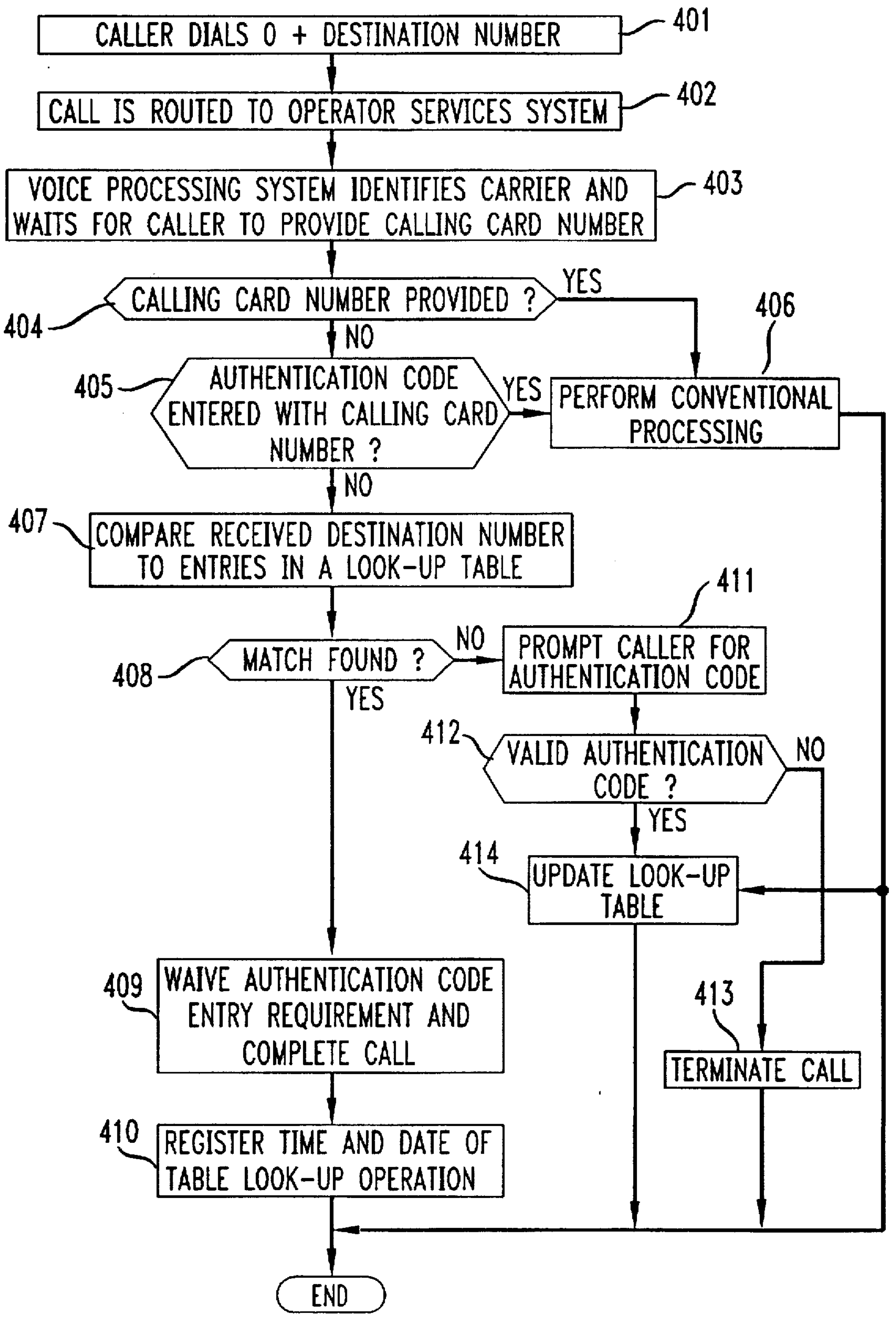
FIG. 4 is a flow diagram of call processing instructions executed by some of the components of FIG. 1 to automatically authenticate a calling card caller.

With reference to FIG. 4, automatic authentication of a calling card subscriber is initiated in step 401, when the subscriber dials "0" followed by the ten-digit destination telephone number. The "0" digit indicates to land-line network 60 that the call is an operator-services call. Accordingly, in step 402, the call and the dialed digits are routed to operator services system 104. Upon receiving the digits dialed by the caller, operator services system 104, through voice processing system 107, in step 403, presents an announcement to the caller identifying the carrier servicing the call and waits for the caller to provide a calling card number.

Thereafter, the operator services system, in step 404, determines whether the caller has entered a calling card number. This is accomplished by operator services system 104 activating a timer after the announcement has been presented to the caller. Operator services system 104 is arranged to infer that no calling card number will be provided if the caller has not entered a calling card number within a predetermined period of time. In that case, operator services system 104 routes the call to an attendant position (not shown) where the call is serviced, in step 406, by a live operator in the conventional fashion.

When a calling card number is provided by the caller, as determined in step 404, operator services system 104 analyzes the sequence of digits in the calling card number, in step 405, to determine whether the calling card number provided by the caller includes an authentication code. As is well known in the art, a line-based calling card account number or non-line-based calling card number includes at least eleven digits when the PIN is included therein. Hence operator services system 104 "infers" that no PIN or authentication code is provided by a calling card caller when less than 11 digits are received for the calling card number.

If the authentication code is provided in the calling card number, as determined in step 405, the calling card number is verified in conventional validation database 106 using conventional techniques, and the call is processed in a conventional manner, as indicated in step 406. The database may then be updated, in step 414, as described hereinbelow. However, if the calling card number provided by the caller does not include an authentication code, as determined in step 405, the operator service system 104 compares the destination number dialed by the caller with the entries in the destination number column of the table shown in FIG. 5 for the entered card number, as shown in step 407. The table shown in FIG. 5 is stored in automatic authentication database 103.

FIG. 5 illustrates a table that associates calling card numbers with destination numbers for which the authentication code requirement is waived for calls directed thereto that are charged to the associated calling card. Entries in the "card number" column of FIG. 5 show different types of calling card numbers. The first entry (from the top down) in the card-number column is a line-based number which is typically the calling card's subscriber residential or business telephone number. The second entry, MY CARD, is a vanity calling card number that is shown in the table as a string of alphabetic characters, instead of the associated string of digits, to emphasize the mnemonic characteristic of the number. The third entry (from the top) in the column is a conventional non-line-based number whose first three digits identify the calling card issuer, while the entry at the bottom of the column is a credit card number.

The destination number column in FIG. 5 shows the destination numbers that are associated with the particular calling card number in the corresponding entry in the card number column. Entries in the destination number column identify called party numbers for which the authentication code entry requirement is waived for calling card calls associated with the corresponding calling card number. As mentioned above, the destination numbers may include national as well as international called party numbers. Furthermore, the called party numbers in the destination number column may be associated with wired as well as wireless domestic and international telephone sets. Every time a particular destination number in the center column matches a called party number dialed by a calling card subscriber, the counter associated with the destination number is incremented by "one". Simultaneously, the date, e.g., in YYDDD format, and the time, e.g., in military time format, are registered in the "dam and time" column of FIG. 5.

As mentioned above, a subscriber may provide some of the initial information stored in his or her profile by establishing a connection to voice processing system 107, which is arranged to prompt the subscriber for that appropriate information. Alternatively, the stored information may be automatically entered, as described below.

Referring back to FIG. 4, when no match is found in the destination column of FIG. 4 for the destination number provided by the caller, as determined in step 408, the operator service system 104, in step 411, uses its voice processing system 107 to prompt the caller for an authentication code. If an invalid authentication code is received from the caller, as determined in step 412, the call is terminated, as indicated in step 413. When operator service system 104 receives a valid authentication from the caller, as determined in step 411, the call is completed in the conventional manner. Thereafter, an updating process for the look-up table of FIG. 5 may be initiated in step 414, in accordance with an aspect of the invention. Alternatively, a new record may be created for the subscriber by entering the calling card number and the called party number provided by the caller in the appropriate fields, in accordance with an aspect of the invention.

When a match is found in automatic authentication database 103 for the called party number dialed by the caller and the calling card number, as determined in step 408, the authentication code entry requirement is waived and the call is completed in the conventional manner, as indicated in step 409. Thereafter, operator services system 104, in step 410, may increment the counter associated with the mapped destination number by "one" and may register the time and date of the look-up operation for the mapped destination number in the table of FIG. 4.

Figure 6:
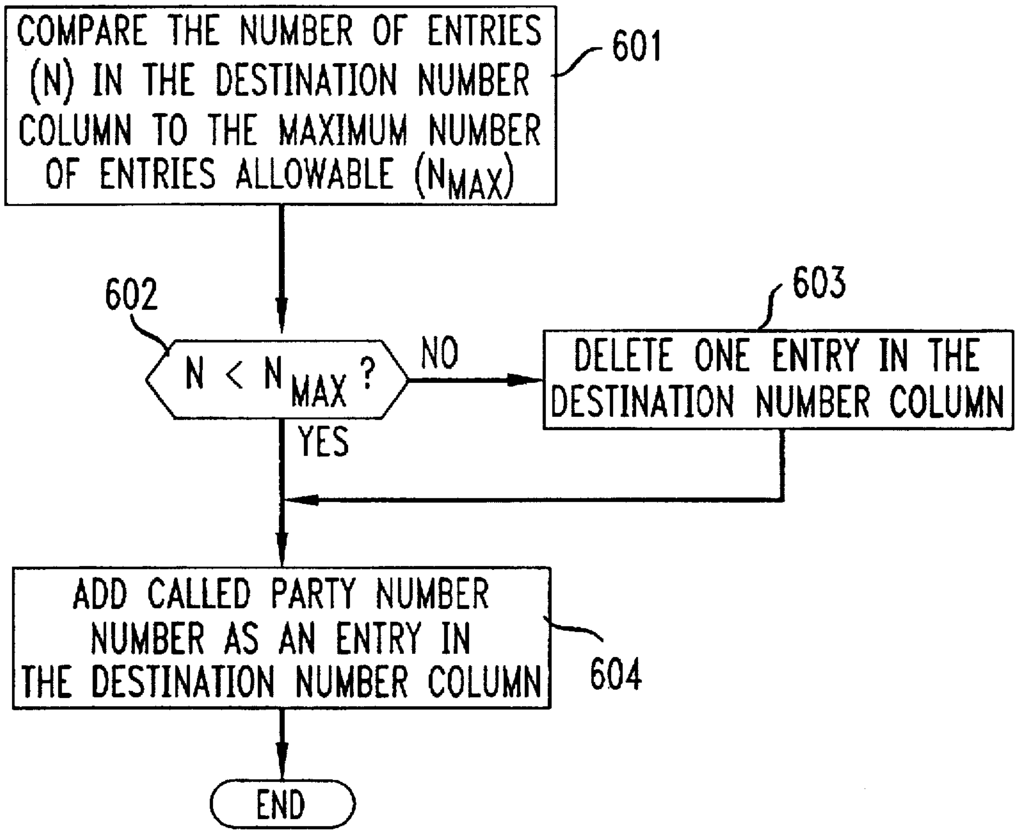
FIG. 6 shows in flow diagram format instructions executed by a processor to update the tables of FIGS. 3 and 5.

FIG. 6 shows in flow diagram format an illustrative process for updating the look-up tables of FIGS. 3 and 5.

The process is initiated in step 601, when processor 55 (or operating services system 104) compares the number of entries (N) in the destination number column of FIG. 3 (or FIG. 5) for the MIN/ESN of the telephone set originating the call (or the credit card to which the call is to be charged) to the maximum number of entries $N_{max}$ allowable for a MIN/ESN pair (or calling card number). This comparison is needed because the destination number column of FIG. 3 (or FIG. 5) for each MIN/ESN pair (or calling card number) can have a finite number of entries $N_{max}$. If the number of existing entries N in the destination number column for each MIN/ESN pair (or calling card number) is less than $N_{max}$, as determined in step 602, the called party number dialed by the caller is added to the entries of the destination number column of FIG. 2, as indicated in step 604. If $N=N_{max}$, as determined in step 602, one of the entries in the destination number column for the particular subscriber associated with the MIN/ESN pair (or calling card number) is deleted in step 603, before the called party number dialed by the caller is added to the entries of the destination number column, as shown in step 604.

Different criteria may be used to select a particular entry for removal in step 603. Eligible for removal are all the entries with a "T" (for temporary) character stored in their characteristic field. By contrast, the entries in the tables of FIGS. 3 and 5 that have a "P" (for permanent) stored in the characteristic field, may never be selected for removal simply by a call being placed and by the entering of the authentication code. Selection of an entry (with a "T" in the characteristic field) for removal may be predicated, for example, on the relative value of either the content of the "time and date" field or the counter field, as compared to other entries associated with the same destination number. In a first implementation, the entry (among all other temporary entries associated with the same calling card number or MIN/ESN pair) with the lowest numerical value in the "time and date" field may be deleted. In a second implementation, the entry (among all other temporary entries associated with the same calling card number or MIN/ESN pair) with the lowest numerical value in the counter field may be deleted. It should be noted that the value in the "time and date" field denotes the last time and date a specific destination number was dialed by a subscriber. Hence, the first implementation operates to remove the destination number that has not been dialed for the longest period of time. By contrast, the second implementation removes the least used destination number for a credit card number or a MIN/ESN pair.

The foregoing is to be construed as only being an illustrative embodiment of this invention. Persons skilled in the art can easily conceive of alternative arrangements providing functionality similar to this embodiment without any deviation from the fundamental principles or the scope of this invention.

We claim:

1. A method of processing a call initiated by a caller, said method comprising the steps of:

receiving a destination telephone number and identification information associated with said call, and overriding a requirement of receiving an authentication code to complete said call when a) an authentication code is required to process said call, and b) said destination telephone number is identified in a profile that is retrieved using said identification information associated with said call.

2. The method of claim 1 wherein said call is a wireless call and said identification information associated with said call is an electronic serial number for a wireless end-user device from which said call was initiated.

3. The method of claim 1 wherein said call is a wireless call and said identification information associated with said call is a mobile identification number for a wireless end-user device from which said call was initiated.

4. The method of claim 1 wherein said call is a credit card call and wherein said identification information is a calling card number.

5. A method of preventing theft of communications services, said method comprising the steps of:

storing in a computer's storage area a first table which contains i) information associated with at least one user of a communications network, and ii) an authentication code which is required to be entered to allow said at least one user to receive at least one communications service from said communications network;

a second table which contains a plurality of destination addresses for which said authentication code requirement is waived for said at least one user;

determining whether a particular destination address received in conjunction with a communications service request from said at least one user matches an entry in said second table for said at least one user; and in response to said determination, satisfying said communications services request when no authentication code is provided by said at least one user only if a match is found in said second table.

6. The method of claim 5 further comprising the step of:

denying said communications service request when a) no match is found in said second table for said particular destination number, and b) said authentication code stored in said first table is not provided by said at least one user.

7. The method of claim 5 further comprising the step of:

prompting said at least one user to enter said authentication code that is stored in said first table when no match is found for said particular destination address in said second table.

8. The method of claim 5 further comprising the step of:

storing said particular destination address in said second table when a) no match is found for said particular destination address in said second table, and b) said authorization code stored in said first table is provided by said at least one user.

9. A method of processing a wireless call, said method comprising the steps of:

receiving as part of the call origination information a destination telephone number and information associated with a wireless end-user device being used by a caller;

completing said call to said received destination number when said received destination number is identified in a profile that is retrieved based on said information associated with said wireless end-user device;

prompting said caller for an authorization code when said received destination number is absent from said profile; and in response to receiving a valid authorization code from said caller, storing said received destination number in said profile, and completing said call.

10. The method of claim 9 wherein said information associated with said wireless end-user device is selected from a group which includes an electronic serial number and a mobile identification number.

11. The method of claim 9 further comprising the step of:

terminating said call in response to receiving an invalid authorization code.

12. The method of claim 9 wherein said profile stores a plurality of destination numbers and wherein said storing step includes the step of:

selecting a particular destination number for removal from said profile in order to free up storage area for storing said received destination number.

13. The invention of claim 12 wherein said particular destination number is selected for removal on a first-stored-first-removed basis.

14. The invention of claim 12 wherein said particular destination number is selected for removal on a least-recently-used basis.

15. A method of processing a calling card call initiated by a caller, said method comprising the steps of:

receiving a destination telephone number and identification information associated with said call, said identification information including a calling card number;

determining that no authentication code has been provided by said caller with said calling card number;

searching a database to match the received destination telephone number to an entry stored in said database for said calling card number;

completing said call when a match is found in said database; and storing said destination number in said database for said calling card number such that no authentication code is required to be entered for a subsequent calling card call that is charged to said calling card number, and that is directed to said destination number.

16. The method of claim 15 further comprising the step of:

prompting said caller to enter said authorization code when no match is found; and completing said call in response to receiving a valid authorization code from said caller.

17. The method of claim 16 further comprising the step of:

terminating said call when an invalid authentication code is provided by said caller.

18. A communications system for authenticating users comprising:

a computer's storage area containing a first table which stores i) information associated with at least one user of a communications network, and ii) an authentication code which is required to be entered to allow said at least one user to receive at least one communications service from said communications network;

a second table which stores a plurality of destination addresses for which said authentication code requirement is waived for said at least one user;

a processor which determines whether a particular destination address received in conjunction with a call initiated by a caller alleging he is said at least one user matches an entry in said second table; and a switch which completes said call when a match is found for said particular destination address in said second table.

19. The system of claim 18 further comprising:

a voice information system which prompts said caller for said authentication code when no match is found for said particular destination address.

20. The system of claim 18 further comprising:

means for denying said communications service request when an invalid authorization code is provided by said caller in response to a prompt from said information system.

21. An authentication system for use in a communications network, said system comprising:

a switching system which receives as part of a request to complete a call a destination number and information associated with a caller who initiated said call; and a processor which a) determines whether an authentication code is required to be provided by said caller for completion of calls of the type of said call, and if so, b) waives said authentication code requirement only if said destination number is included in a profile associated with said user.

22. The system of claim 21 wherein said information associated with said caller is used as a search key by said processor to retrieve said profile.

23. The system of claim 21 further comprising:

a voice information system which a) prompts said caller for said authentication code when said destination number is not included in said profile.

24. The system of claim 23 further comprising:

means for storing said destination number in said profile after completion of said call.

* * * * *